US011826693B2

(12) United States Patent
Müller-Hellwig et al.

(10) Patent No.: US 11,826,693 B2
(45) Date of Patent: Nov. 28, 2023

(54) UTILIZATION OF NITROGEN OXIDES FROM AMBIENT AIR

(71) Applicant: AUDI AG, Ingolstadt (DE)

(72) Inventors: Simone Müller-Hellwig, Ingolstadt (DE); Hagen Seifert, Regensburg (DE); Alexander Krajete, Pasching (AT)

(73) Assignee: AUDI AG, Ingolstadt (DE)

( * ) Notice: Subject to any disclaimer, the term of this patent is extended or adjusted under 35 U.S.C. 154(b) by 587 days.

(21) Appl. No.: 16/973,206

(22) PCT Filed: Jun. 18, 2019

(86) PCT No.: PCT/EP2019/066051
§ 371 (c)(1),
(2) Date: Dec. 8, 2020

(87) PCT Pub. No.: WO2020/015946
PCT Pub. Date: Jan. 23, 2020

(65) Prior Publication Data
US 2021/0252449 A1    Aug. 19, 2021

(30) Foreign Application Priority Data
Jul. 17, 2018    (DE) .................... 10 2018 211 819.1

(51) Int. Cl.
*B01D 53/04* (2006.01)
*C01B 21/48* (2006.01)
*C05C 5/00* (2006.01)

(52) U.S. Cl.
CPC .......... *B01D 53/0415* (2013.01); *C01B 21/48* (2013.01); *C05C 5/00* (2013.01); *B01D 2253/108* (2013.01); *B01D 2257/404* (2013.01); *B01D 2259/4009* (2013.01)

(58) Field of Classification Search
CPC .......... B01D 53/0415; B01D 2253/108; B01D 2257/404; B01D 2259/4009; B01D 2258/06; C01B 21/48; C01B 21/38; C05C 5/00; A61L 9/00; A61L 9/014; A61L 2209/10; A61L 2209/133; A61L 2209/22
See application file for complete search history.

(56) References Cited

U.S. PATENT DOCUMENTS

| | | | |
|---|---|---|---|
| 5,057,128 A | 10/1991 | Panzica et al. | |
| 5,158,582 A | 10/1992 | Onitsuka et al. | |
| 7,514,058 B1 * | 4/2009 | Hitzman | C01B 21/38 423/359 |
| 2006/0249027 A1 * | 11/2006 | Adolphsen | B01D 53/0415 96/134 |
| 2007/0186769 A1 * | 8/2007 | Nishi | B01J 20/18 95/129 |
| 2012/0118160 A1 * | 5/2012 | Heffes | B01J 20/08 264/176.1 |
| 2020/0198970 A1 * | 6/2020 | Müller-Hellwig | B01D 53/04 |

FOREIGN PATENT DOCUMENTS

| | | |
|---|---|---|
| CN | 1242252 A | 1/2000 |
| CN | 1733356 A | 2/2006 |
| CN | 101380539 A | 3/2009 |
| CN | 101530828 A | 9/2009 |
| CN | 102836614 A | 12/2012 |
| CN | 103706239 A | 4/2014 |
| CN | 104154548 A | 11/2014 |
| CN | 204824173 U | 12/2015 |
| CN | 111094710 A | 5/2020 |
| DE | 24 00 688 A1 | 7/1975 |
| DE | 19628796 C1 | 10/1997 |
| DE | 20 2015 100 308 U1 | 5/2015 |
| DE | 102018000378 A1 | 7/2019 |
| EP | 2 476 473 A1 | 7/2012 |
| FR | 2 913 610 A1 * | 9/2008 .......... A61M 16/009 |
| GB | 2 124 103 A | 2/1984 |
| GB | 2124103 A | 2/1984 |
| JP | H09-249472 A | 9/1997 |
| JP | 2003103140 A | 4/2003 |
| JP | 2009285592 A | 12/2009 |

OTHER PUBLICATIONS

Office Action dated Feb. 16, 2022, in connection with corresponding Chinese Application No. 201980047349.1 (22 pp., including machine-generated English translation).
Decision of Rejection dated Jan. 28, 2023, in corresponding Chinese Application No. 201980047349.1, 16 pages.
Office Action dated Aug. 11, 2022, in connection with corresponding Chinese Application No. 201980047349.1 (20 pp., including English translation).
German Office Action dated Jul. 6, 2021, in connection with corresponding DE Application No. 10 2018 211 819.1 (12 pp., including machine-generated English translation).
Examination Report dated Mar. 22, 2019 in corresponding German application No. 10 2018 211 819.1; 10 pages including Machine-generated English-language translation.
International Search Report dated Sep. 2, 2019 in corresponding International application No. PCT/EP2019/066051; 6 pages.
Written Opinion of the International Searching Authority dated Sep. 2, 2019 in corresponding International application No. PCT/EP2019/066051; 10 pages including Machine-generated English-language translation.
International Preliminary Report on Patentability dated May 14, 2020 in corresponding International application No. PCT/EP2019/066051; 17 pages.

* cited by examiner

*Primary Examiner* — Timothy C Vanoy
(74) *Attorney, Agent, or Firm* — Maier & Maier, PLLC

(57) ABSTRACT

Utilization of nitrogen oxides contained in the ambient air including a system and a method with which the nitrogen oxides can be utilized for the production of liquid or solid chemicals.

14 Claims, 2 Drawing Sheets

UTILIZATION OF NITROGEN OXIDES FROM AMBIENT AIR

FIELD

The disclosure relates to the utilization of nitrogen oxides contained in the ambient air. A system and a method are presented with which the nitrogen oxides may be used for the production of liquid or solid chemicals.

BACKGROUND

Nitrogen oxides in the atmosphere are produced by natural phenomena such as lightning strikes, but mainly during combustion of fossil fuels such as coal or oil. In agglomerations a major part of the emissions of nitrogen oxides is caused by traffic. More and more cities are confronted with the problem that measured local emission levels are too high. It is the cities' responsibility towards their citizens to make sure the air is clean. One measure in order to reduce nitrogen oxides is the installation of catalysts which reduce nitrogen oxides in the exhaust gas systems of vehicles.

EP 2 476 473 A1 relates to a filter module for the adsorption of particles in the ambient air and/or for the conversion of gaseous air pollutants which are e.g. produced during the operation of motor vehicles on streets or rails or during other combustion events. The filter module filters pollutants such as fine dust, nitrogen oxides or highly volatile hydrocarbons from the ambient air and catalytically converts them into less toxic compounds. The used filter material can be replaced.

From DE 20 2015 100 308 U1, a filter arrangement composed of modules for removing solid and/or liquid particles contained in a gaseous medium is known. The module comprises a housing in which a motor driven arrangement for producing a flow of the gaseous medium and a filter arrangement are arranged. The filter arrangement comprises a filter of class G4 according to DIN EN 779 as a prefilter and a filter of class F7 as a main filter.

With the described methods, either waste in the form of used filter material is produced or the adsorbed pollutants are released again or converted producing other gaseous pollutants during the regeneration of the filter material.

SUMMARY

Against this background, the object of the invention is to provide a method and a system for reducing the concentration of nitrogen oxides in the ambient air and for the utilization of the nitrogen oxides removed from the ambient air which avoid the described disadvantages.

One feature of the invention is that nitrogen oxides ($NO_x$) which were removed from the ambient air by the adsorption on an adsorbent material of a $NO_x$ reservoir and have accumulated in the $NO_x$ reservoir, are desorbed from the $NO_x$ reservoir after removal of the loaded $NO_x$ reservoir and are taken to a conversion process. This conversion process uses nitrogen oxides desorbed from the adsorbent material for the production of liquid or solid nitrogenous compounds, for example fertilizers. The adsorbent material can be reused for the adsorption of nitrogen oxides after the desorption of the nitrogen oxides (regeneration of the adsorbent material).

The subject matter of the invention is a method for the utilization of nitrogen oxides contained in the ambient air. The method of the invention comprises, as a first step, the adsorption of nitrogen oxides ($NO_x$) from the ambient air in a stationary adsorbent unit. For this purpose, an ambient air flow is guided through a stationary adsorbent unit. In the adsorbent unit, nitrogen oxides ($NO_x$) contained in the air flow are adsorbed. Thereby, the adsorbent unit is charged with $NO_x$. In one embodiment of the method this step is carried out until the capacity limit of the absorption of nitrogen oxides of the adsorbent unit is reached. The air flowing out of the adsorbent unit is depleted of nitrogen oxides.

In one embodiment the adsorbent unit contains an adsorbent material which can bind nitrogen oxides and the nitrogen oxides ($NO_x$) are adsorbed by the adsorbent material arranged in the adsorbent unit.

In one embodiment the adsorbent material comprises at least one inorganic material from the class of the aluminum oxides or aluminosilicates. In one embodiment the adsorbent material comprises at least one zeolite. The principle of zeolites which can adsorb nitrogen oxides is known to the person skilled in the art. Examples comprise ZSM-5, zeolite Y and mordenite.

In another embodiment the adsorbent material comprises alkaline oxides or alkaline earth oxides or alkaline carbonates or alkaline earth carbonates. In a particular embodiment the adsorbent material comprises barium oxide, optionally in combination with platinum and rhodium.

In one embodiment the adsorbent material is used in a granular form. In a further embodiment the adsorbent material consists of particles with a grain size, i.e. an equivalent diameter, in the range of 1 to 5 mm. In one embodiment the adsorbent material is present as a packing in a filter module of the adsorbent unit. In a further embodiment a container permeable to the air flow is filled with the adsorbent material in a filter module of the adsorbent unit.

Upon completion of the first step of the method of the invention, in particular upon reaching the capacity limit of the adsorbent unit, the air flow is interrupted by the adsorbent unit loaded with nitrogen oxides ($NO_x$) and the one or more filter module(s) of the adsorbent unit or the adsorbent material contained therein are removed. The adsorbed nitrogen oxides ($NO_x$) bound in the adsorbent unit are then desorbed and guided to a conversion of the nitrogen oxides ($NO_x$) into liquid or solid nitrogenous compounds.

In one embodiment of the method filter modules of the adsorbent unit loaded with nitrogen oxides ($NO_x$) are replaced by unloaded filter modules. In another embodiment an adsorbent material in the adsorbent unit loaded with nitrogen oxides ($NO_x$) is replaced by an unloaded adsorbent material. In another embodiment the adsorbent material loaded with $NO_x$ is collected at a collection site and temporarily stored until the nitrogen oxides are desorbed from the adsorbent material.

In one embodiment the desorption of the nitrogen oxides from the adsorbent unit is by heating filter modules of the adsorbent unit and/or reducing the pressure or by guiding through hot water vapor, hot gas or a liquid solvent, e.g. water. Thus, the adsorbed $NO_x$ is converted into the vapor or liquid phase and the filter module is regenerated.

In one embodiment the desorption of the nitrogen oxides from an adsorbent material loaded with $NO_x$ which was taken from the adsorbent unit is by treating the adsorbent material with heat, negative pressure, hot vapor, hot gas or a liquid solvent (e.g. water). The $NO_x$ is converted into the vapor or liquid phase, the adsorbent material remains unchanged. If necessary, the adsorbent material must be dried before it can be reused for the removal of nitrogen oxides from ambient air. Preferably, the temperature during desorption as well as during drying is not more than 200° C.

The $NO_x$ separated from the adsorbent unit is guided to another conversion. In doing so, the nitrogen oxides ($NO_x$) react into liquid or solid nitrogenous compounds. For example, the $NO_x$ can be introduced into the production chain of nitrous acid, nitrates or non-aqueous solvents based on $NO_2$. In one embodiment the liquid or solid nitrogenous compounds comprise nitrates.

The method of the invention offers a number of advantages, in particular it can contribute to the reduction of environmental pollution and energy consumption. With regard to the overall process, atmospheric nitrogen is oxidized into $NO_x$ which is temporarily stored in an adsorbent unit and converted into liquid or solid nitrogenous compounds after desorption.

The nitrogen oxides are thus removed from the atmosphere or the ambient air of the adsorbent unit. By using the method of the invention, significant amounts of nitrogen oxides can be drawn from the ambient air in polluted areas, e.g. busy streets or in tunnels. In tunnels, the amount of nitrogen oxides in the air can be significantly reduced.

The resulting reaction product can be reused, for example as a fertilizer. At the same time, $NO_2$ which otherwise would have to be produced for the production of the product is substituted. By substituting $NO_2$ in the conversion reaction, energy is saved.

The nitrogen oxides contained in the ambient air, which e.g. come from the exhaust gases of combustion engines, are made industrially usable by the method of the invention, as they are available in a concentrated form after the desorption and are not diluted by the other air constituents anymore. As large amounts of nitrogen oxides are used in several industrial methods, enormous amounts of the nitrogen oxides recovered from the ambient air can be further processed, i.e. the nitrogen circle can basically be of any size.

The subject matter of the invention also is a system for the utilization of nitrogen oxides from the ambient air. The system comprises a stationary adsorbent unit which is adapted for the adsorption of nitrogen oxides from the ambient air, a desorption module which is adapted to desorb nitrogen oxides adsorbed in the adsorbent unit, and a reaction unit which is adapted to convert the desorbed nitrogen oxides into liquid or solid nitrogenous compounds. The system is in particular suitable for carrying out the method of the invention.

The system comprises an adsorbent unit which is adapted for the adsorption of nitrogen oxides ($NO_x$) from the ambient air. In one embodiment the adsorbent unit comprises a housing with at least one inflow and outflow opening in the housing wall, a filter module in the interior of the housing which is fluidly connected to the inlet and outlet opening so that an air channel is formed, and an air intake apparatus in order to draw air from the environment and guide it through the filter module. In one embodiment the air intake apparatus is a blower.

In a particular embodiment a drying apparatus or a dehumidification apparatus which removes water from the air flow before it enters the filter module is provided in the air channel of the adsorbent unit. This variant is used especially when hydrophile adsorbent materials are used in the filter module. By drying the air flow the reduction of the adsorption capacity of the adsorbent material for nitrogen oxides by water loads is prevented.

In one embodiment the adsorbent unit contains an adsorbent material which is adapted to bind nitrogen oxides ($NO_x$) in an adsorptive manner. In a particular embodiment the adsorbent material comprises at least one zeolite, for example ZSM-5, zeolite Y or mordenite. In another embodiment the adsorbent material comprises alkaline oxides, alkaline earth oxides, alkaline carbonates or alkaline earth carbonates. In a particular embodiment the adsorbent material comprises barium oxide, optionally in combination with platinum and rhodium.

In one embodiment the adsorbent unit contains one or more filter modules designed as a replacement cartridge. Such a replacement cartridge can be removed from its position in the air flow without great effort and without destruction and replaced by another, equivalent cartridge.

In a further embodiment in which an adsorbent material is arranged in the adsorbent unit, e.g. in one or more filter modules, the adsorbent unit is designed such that its adsorbent material loaded with nitrogen oxides ($NO_x$) can be removed without destruction and replaced by unloaded adsorbent material. For example, the adsorbent unit can comprise a resealable container from which the adsorbent material can be taken or removed after the container is opened, e.g. by folding open, unscrewing or by opening a lid or a flap. After filling the adsorbent unit with an unloaded adsorbent material, it can be resealed and again provided with an air flow.

In one embodiment the adsorbent unit is a stationary facility which is used in places in which there are high concentrations of nitrogen oxides in the air, e.g. in agglomerations, on busy streets or in tunnels. In one embodiment the adsorbent unit is mounted in a tunnel, e.g. on the tunnel ceiling. There can also be several adsorbent units in one tunnel. In another embodiment the stationary adsorbent unit is arranged outside the tunnel and an air flow is drawn from the tunnel interior via suitable apparatuses, guided through the adsorbent unit and then returned into the tunnel. In one exemplary embodiment, the adsorbent unit is designed for a nominal air flow of 10,000 to 30,000 $m^3/h$. Therefore, a fan power in the range of 1 to 10 kW is required, e.g. 4 kW for 20,000 $m^3/h$.

In one embodiment the adsorbent unit comprises one or more filter modules designed as replacement cartridges and filled with an adsorbent material. The cartridges can easily be removed and replaced by cartridges with unloaded adsorbent material when the loading limit of the adsorbent material is reached. In an exemplary embodiment the cartridge holds 300 to 400 kg of adsorbent material. In one embodiment, the cartridge has a length of about one meter, e.g. 80 to 120 cm.

The system of the invention comprises a desorption module which is adapted to desorb nitrogen oxides adsorbed in the adsorbent material.

In one embodiment the desorption module is adapted to heat filter modules or replacement cartridges filled with an adsorbent material (optionally under reduced pressure) or to supply them with hot water vapor, hot gas or a liquid solvent and thereby desorb nitrogen oxides from the filter modules or replacement cartridges.

In a further embodiment the desorption module is adapted to heat adsorbent material loaded with nitrogen oxides (optionally under reduced pressure) or to treat it with hot water vapor, hot gas or a liquid solvent and thereby desorb nitrogen oxides from the adsorbent material.

The system of the invention also comprises a reaction unit which is adapted to convert the desorbed nitrogen oxides from the desorption module into liquid or solid nitrogenous compounds. The reaction unit is adapted to accept a nitrogenous reactant flow from the desorption module and to convert the nitrogen oxides with further reactants. In one embodiment the reaction unit comprises a reactor for the conversion of nitrogen oxides into nitrous acid. In a further embodiment the reaction unit comprises a reactor for the conversion of nitrous acid into nitrates.

It is understood that the features stated above and still to be explained below can not only be used in the respective stated combination, but also in other combinations or alone, without leaving the context of the present invention.

BRIEF DESCRIPTION OF THE FIGURES

The invention will be illustrated below by means of an example embodiment and will be further described with reference to the example and the accompanying drawing. The following is shown.

DETAILED DESCRIPTION

Figure 1:
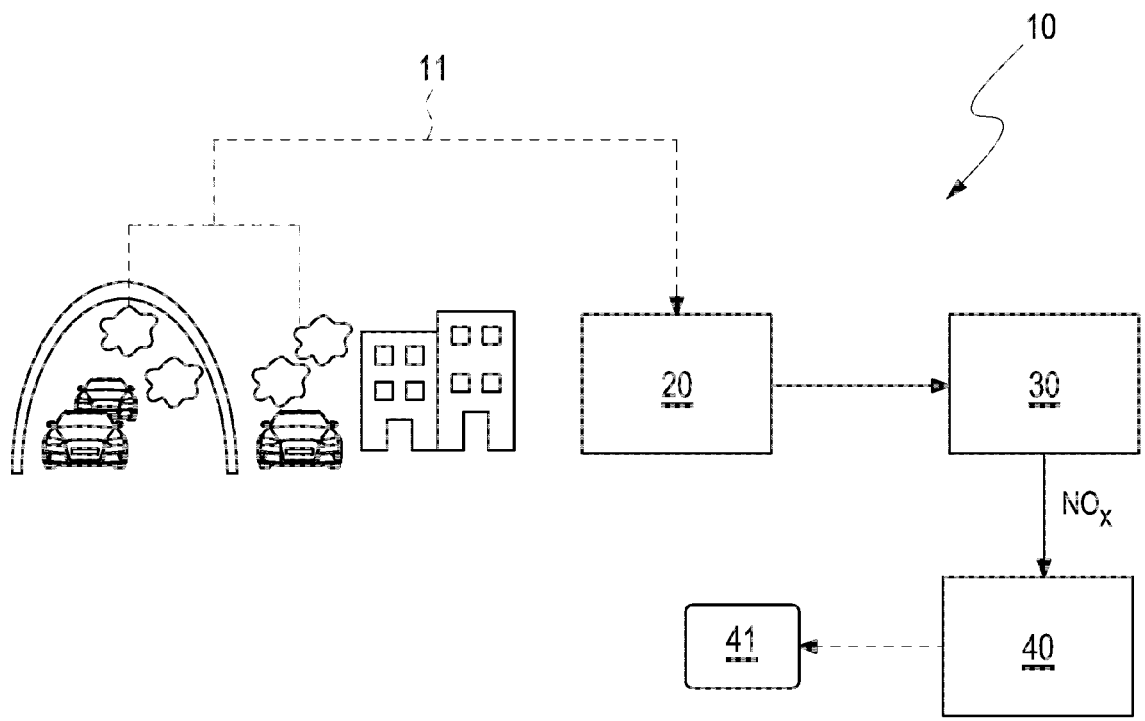
FIG. 1 a schematic representation of an embodiment of the system of the invention for the utilization of nitrogen oxides.

FIG. 1 schematically shows an embodiment of the system 10 of the invention for the utilization of nitrogen oxides. An air flow 11 containing nitrogen oxides is guided through a stationary adsorbent unit 20 which is adapted for the adsorption of nitrogen oxides ($NO_x$) from the air flow 11, for example in a replacement cartridge containing an adsorbent material. During the operation of the adsorbent unit 20, $NO_x$ is adsorbed in the adsorbent unit 20. The adsorbent unit 20 is thus charged with $NO_x$ and can receive $NO_x$ up to the acceptance limit of the adsorbent unit.

The adsorbent material in the adsorbent unit 20 is exchanged upon reaching the acceptance limit at the latest, i.e. when the adsorbent material is fully saturated with $NO_x$. Either a filter module of the adsorbent unit 20 is exchanged as a whole or the adsorbent material in the adsorbent unit 20 is replaced by new, unloaded material. The filter modules of the adsorbent unit 20 are therefore preferably designed as a replacement cartridge or allow the removal of the loaded adsorbent material and the replacement of the loaded material by unloaded adsorbent material without much mounting effort and in particular without destroying the adsorbent unit 20.

The material loaded with $NO_x$ can be collected at a collection site and temporarily stored in order to have larger amounts of the loaded material available for the next step and thus make the utilization step more efficient.

Filter modules of the adsorbent unit 20 or the loaded adsorbent material contained therein are then transferred to a desorption module 30. In the desorption module 30, the adsorbed nitrogen oxides are desorbed. In one variant the adsorbent material loaded with $NO_x$ is either treated with heat, hot vapor, hot gas or a liquid solvent (e.g. water). The $NO_x$ goes into the vapor or liquid phase, the adsorbent material remains unchanged. If necessary, the adsorbent material must be dried before reuse. During desorption and during drying moderate temperatures of not more than 200° C. should be used. The separated $NO_x$ is supplied to a reaction unit 40 for further conversion.

In the reaction unit 40, the desorbed nitrogen oxides are converted into liquid or solid nitrogenous compounds 41. For example, the $NO_x$ can be introduced into the production chain of nitrous acid, nitrates or non-aqueous solvents based on $NO_2$.

In one variant the nitrogen oxides $NO_x$ in the reaction unit 40 are first converted into nitrous acid $HNO_3$. The nitrous acid is then converted into nitrates which are for example used as a nitrogen fertilizer.

Figure 2:
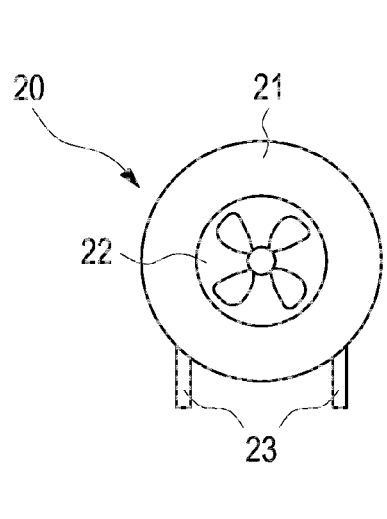
FIG. 2a a frontal view of an embodiment of an absorbent unit in a schematic representation.
FIG. 2b a frontal view of another embodiment of an absorbent unit in a schematic representation.
FIG. 2c a longitudinal section of the adsorbent unit shown in FIG. 2a) in a schematic representation.
Figure 2:
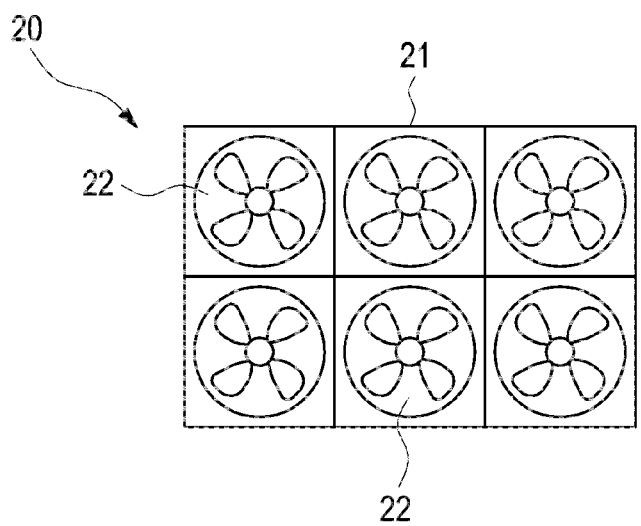
Figure 2:
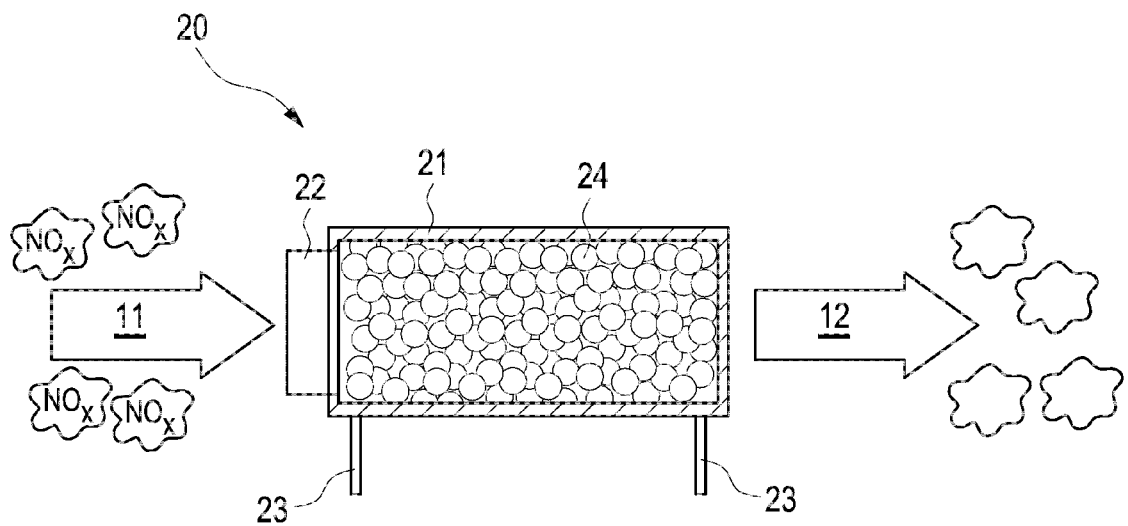

FIG. 2a schematically shows a frontal view of an embodiment of an adsorbent unit 20. The adsorbent unit 20 comprises a housing 21 on whose inflow opening an air intake apparatus, e.g. a blower 22, is arranged, which is configured to guide an air flow through the housing 21. Fixation elements 23 allow the stationary mounting of the adsorbent unit 20.

FIG. 2b schematically shows a frontal view of another embodiment of an adsorbent unit 20. The represented adsorbent unit 20 comprises several modules which each have a blower 22. In one embodiment each module has its own housing 21 and adjacent housings 21 are connected to one another by suitable means, e.g. screwed or welded together. In another embodiment all modules are mounted in a common housing 21 which has a plurality of compartments for individual modules.

FIG. 2c shows a longitudinal section of the adsorbent unit 20 shown in FIG. 2a) in a schematic representation. A granular adsorbent material 24 is arranged in the housing 21. The blower 22 guides an air flow 11 containing nitrogen oxides through the housing 21 with the adsorbent material 24. The adsorbent material 24 adsorbs nitrogen oxides from the air flow 11 and an air flow 12 depleted of nitrogen oxides exits the housing.

Figure 3:
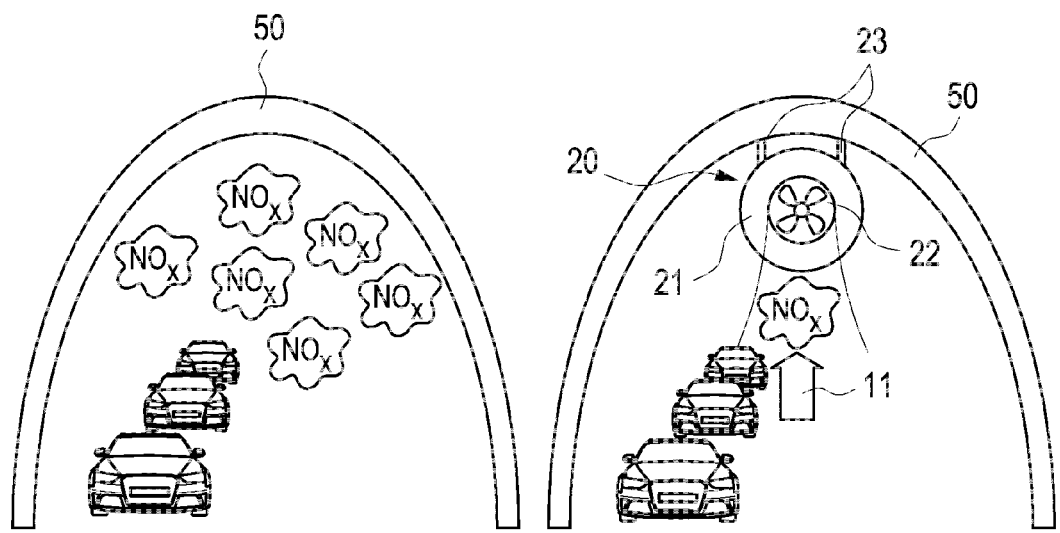
FIG. 3 schematic representations of a tunnel with road traffic without (left) and with (right) an embodiment of an adsorbent unit of the system of the invention.

FIG. 3 schematically shows, on its left side, a tunnel 50 with road traffic. The emissions of nitrogen oxides of the vehicles are symbolized by $NO_x$ clouds. On the right side, a tunnel 50 with an embodiment of an adsorbent unit 20 of the system of the invention is schematically represented. The adsorbent unit 20 is mounted on the tunnel ceiling with fixation elements 23. The blower 22 draws an air flow 11 loaded with nitrogen oxides from the vehicle emissions through the adsorbent unit 20.

The legal limit value for the concentration of nitrogen oxides in the air currently is 40 μg/m³. In a tunnel, concentrations of up to 1 mg/m³ (1000 μg/m³) can be reached in case of heavy traffic. With an air volume in the tunnel of for example 150,000 m³, 1 ppm $NO_x$ (1 mg/m³) corresponds to about 150 g $NO_x$ which can be removed from the air by the adsorbent unit 20. In an example embodiment the blower 22 of the adsorbent unit 20 has a fan power of 4 kW and the adsorbent unit 20 is designed for a nominal air flow of 20,000 m³/h. The adsorbent unit 20 contains a cartridge with 400 kg of adsorbent material 24. Within a period of about 8 h, an amount of air which corresponds to the total air volume in the tunnel is guided through the adsorbent unit 20 and the nitrogen oxide contained in the air flow 11 is adsorbed in the adsorbent material 24. Thus, about 450-500 g of $NO_x$ can be achieved per day. The adsorption limit of the cartridge is reached after about one month, by then the adsorbent material 24 has accepted about 15 kg of $NO_x$. The cartridge is then replaced and the adsorbed nitrogen oxides are recovered.

REFERENCE NUMERAL LIST 10 system
11 air flow containing nitrogen oxides 12 air flow depleted of nitrogen oxides
20 adsorbent unit
21 housing
22 air intake apparatus/blower
23 fixation element
24 adsorbent material
30 desorption module
40 reaction unit
41 reaction product (liquid or solid compounds containing nitrogen oxides)
50 tunnel

The invention claimed is:

1. A method for the utilization of nitrogen oxides contained in the ambient air, comprising the adsorption of nitrogen oxides from the ambient air in a stationary adsorbent unit which contains an adsorbent material, removing the adsorbent material loaded with nitrogen oxides from the adsorbent unit, collecting and temporarily storing the adsorbent material loaded with nitrogen oxides at a collecting site, transferring the adsorbent material loaded with nitrogen oxides to a desorption module, desorption of adsorbed nitrogen oxides from the adsorbent material and conversion of the nitrogen oxides into liquid or solid nitrogenous compounds.

2. The method according to claim 1, wherein the adsorbent material comprises at least one zeolite.

3. The method according to claim 2, wherein the liquid or solid nitrogenous compounds comprise nitrates.

4. The method according to claim 1, wherein the liquid or solid nitrogenous compounds comprise nitrates.

5. The method according to claim 4, wherein the nitrogen oxides in the reaction unit are first converted into nitrous acid and the nitrous acid is then converted into nitrates.

6. A system for the utilization of nitrogen oxides, comprising a stationary adsorbent unit which is adapted for the adsorption of nitrogen oxides from the ambient air, wherein the stationary adsorbent unit has a housing with at least one inflow and outflow opening in the housing wall, a filter module in the interior of the housing which is fluidly connected to the inlet and outlet opening so that an air channel is formed, and an air intake apparatus in order to draw air from the ambient air and to guide it through the filter module, and wherein the adsorbent unit contains an adsorbent material which is adapted to bind nitrogen oxides in an adsorptive manner, and the adsorbent unit is designed such that adsorbent material loaded with nitrogen oxides can be removed without destruction and replaced by unloaded adsorbent material, a collection site for the temporary storage of adsorbent material loaded with nitrogen oxides, a desorption module which is adapted to heat adsorbent material loaded with nitrogen oxides, optionally under reduced pressure, or to treat it with hot water vapor, hot gas or a liquid solvent and thus desorb nitrogen oxides from the adsorbent material, and a reaction unit which is adapted to convert the desorbed nitrogen oxides into liquid or solid nitrogenous compounds.

7. The system according to claim 6, wherein the adsorbent material comprises at least one zeolite.

8. The system according to claim 7, wherein the adsorbent unit comprises at least one replacement cartridge with adsorbent material.

9. The system according to claim 7, wherein the adsorbent unit is designed for a nominal air flow of 10,000 to 30,000 m$^3$/h.

10. The system according to claim 6, wherein the adsorbent unit comprises at least one replacement cartridge with adsorbent material.

11. The system according to claim 10, wherein the replacement cartridge comprises 300 to 400 kg of adsorbent material.

12. The system according to claim 11, wherein the adsorbent unit is designed for a nominal air flow of 10,000 to 30,000 m$^3$/h.

13. The system according to claim 10, wherein the adsorbent unit is designed for a nominal air flow of 10,000 to 30,000 m$^3$/h.

14. The system according to claim 6, wherein the adsorbent unit is designed for a nominal air flow of 10,000 to 30,000 m$^3$/h.

* * * * *